United States Patent
Trapp

(10) Patent No.: US 11,016,571 B2
(45) Date of Patent: May 25, 2021

(54) OPERATOR CONTROL UNIT FOR A DEVICE

(71) Applicant: Behr-Hella Thermocontrol GmbH, Stuttgart (DE)

(72) Inventor: Ralph Trapp, Paderborn (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 0 days.

(21) Appl. No.: 16/629,387

(22) PCT Filed: Jul. 10, 2018

(86) PCT No.: PCT/EP2018/068640
§ 371 (c)(1),
(2) Date: Jan. 8, 2020

(87) PCT Pub. No.: WO2019/011906
PCT Pub. Date: Jan. 17, 2019

(65) Prior Publication Data
US 2020/0139817 A1 May 7, 2020

(30) Foreign Application Priority Data

Jul. 12, 2017 (DE) ...................... 10 2017 115 673.9

(51) Int. Cl.
*G06F 3/01* (2006.01)
*B60L 53/14* (2019.01)
(Continued)

(52) U.S. Cl.
CPC .............. *G06F 3/016* (2013.01); *B60K 37/06* (2013.01); *B60L 11/1825* (2013.01);
(Continued)

(58) Field of Classification Search
CPC ........... G06F 3/016; G06F 3/041–0416; G06F 3/043–0436; G06F 3/044–0448;
(Continued)

(56) References Cited

U.S. PATENT DOCUMENTS 10,503,260 B2 * 12/2019 Pankratz ............... H01F 7/1638
2002/0171637 A1 11/2002 Kadowaki et al.
(Continued)

FOREIGN PATENT DOCUMENTS

| EP | 3167946 S1 | 5/2017 |
| WO | 2016-012277 A1 | 1/2016 |
| WO | 2016-135425 A1 | 9/2016 |

OTHER PUBLICATIONS

International Search Report for Application No. PCT/EP2018/068640 dated Oct. 11, 2018.

*Primary Examiner* — Sanjiv D. Patel
(74) *Attorney, Agent, or Firm* — Christensen, Fonder, Dardi & Herbert PLLC; Peter S. Dardi; Diane Bennett

(57) ABSTRACT

The operator control unit (10) for a device is provided with an operator control element (14) which has a touch-sensitive operator control surface (16). The operator control element (14) is, for the purpose of being automatically returned to its inoperative position after being deflected out of said inoperative position, elastically mounted in said inoperative position. The mechanical excitation of the operator control element (14) out of its inoperative position for the purpose of tactile feedback in response to operation of the operator control element (14) is performed by means of an actuator (24). A sensor (26) identifies the movement of the operator control element (14) and/or an acceleration and/or force acting on the operator control element (14). When a movement of the operator control element (14) and/or an acceleration and/or force acting on the operator control element (14) are/is identified without sensing contact with the operator control surface (16), the evaluation and actuation unit (22) actuates the actuator (24) to maintain the inoperative position of the operator control element (14) and/or to move the operator control element (14) back to its inoperative position and/or to stabilize the operator control element (14).

6 Claims, 1 Drawing Sheet

(51) Int. Cl.
*B60L 53/31* (2019.01)
*B60L 53/18* (2019.01)
*B60K 37/06* (2006.01)
*B60L 11/18* (2006.01)
*G06F 3/041* (2006.01)
*H02G 11/00* (2006.01)
*H02J 7/00* (2006.01)
*H02G 3/04* (2006.01)

(52) U.S. Cl.
CPC .............. *B60L 53/14* (2019.02); *B60L 53/18* (2019.02); *B60L 53/31* (2019.02); *G06F 3/0416* (2013.01); *H02G 11/00* (2013.01); *H02J 7/00* (2013.01); *B60K 2370/1446* (2019.05); *B60K 2370/158* (2019.05); *B60L 2240/36* (2013.01); *B60L 2270/00* (2013.01); *B60L 2270/32* (2013.01); *H02G 3/0493* (2013.01)

(58) Field of Classification Search
CPC .... G06F 3/0414; G06F 3/04883; G06F 3/017; G06F 2203/014; G06F 3/0488; G06F 2203/013; B60K 2370/143–1442; B60K 37/06

See application file for complete search history.

(56) References Cited

U.S. PATENT DOCUMENTS

| | | | |
|---|---|---|---|
| 2003/0076297 A1 | 4/2003 | Hasser | |
| 2006/0250377 A1* | 11/2006 | Zadesky | G06F 3/03548 345/173 |
| 2013/0009892 A1 | 1/2013 | Salmela | |
| 2014/0118855 A1* | 5/2014 | Whinnery | G02B 7/198 359/841 |
| 2014/0218324 A1 | 8/2014 | Tissot | |
| 2016/0103493 A1 | 4/2016 | Tanninaka et al. | |
| 2016/0195932 A1 | 7/2016 | Czelnik et al. | |
| 2017/0038904 A1* | 2/2017 | Murata | G06F 3/04886 |
| 2017/0052593 A1* | 2/2017 | Jiang | H01L 41/0926 |
| 2017/0148587 A1* | 5/2017 | Fust | H01H 13/10 |
| 2017/0320438 A1* | 11/2017 | Sulzle | B60R 1/0602 |
| 2019/0050053 A1* | 2/2019 | Pankratz | G06F 3/016 |

* cited by examiner

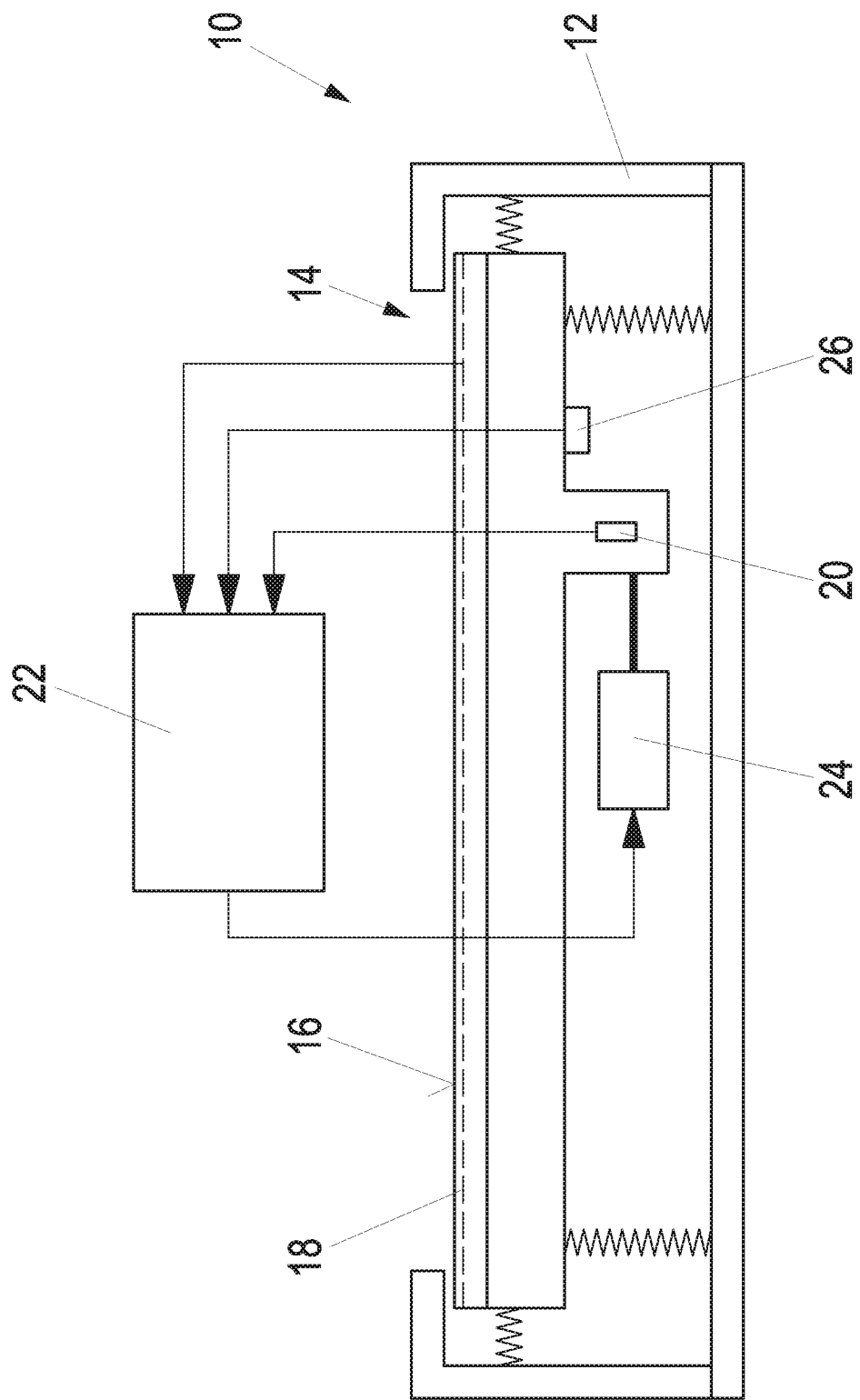

OPERATOR CONTROL UNIT FOR A DEVICE

This application is a national stage application of PCT application PCT/EP2018/068640 to Ralph Trapp, filed Jul. 10, 2018, which claims priority to DE application 10-2017-115-673.9 filed on Jul. 12, 2017, both of which are incorporated herein by reference.

The invention relates to an operating unit for a device, in particular for a vehicle for operating a vehicle component and in particular MMI or HMI. The invention particularly relates to an operating unit with haptic feedback.

Operating units with touch-sensitive operating surfaces, such as touchscreens or touchpads, are characterized by a high variability of the operating surface and a great operating comfort. Such operating units comprise a feedback function that either works optically, acoustically or tactilely in order to feedback a valid operation of the operating unit to the operator. Particularly tactile haptic feedback functions are becoming increasingly popular and are usually accompanied by a force-sense feature where a minimum deflection of the operating surface can be detected by a force or path sensor, for example, which serves to detect a valid operation of the operating surface (see e.g. WO-A-2016/135425 and WO-A-2016/012277).

Operating units with haptic feedback are frequently configured as oscillatory systems in that the operating surface or the operating element, respectively, is elastically mounted with the touch-sensitive operating surface and is mechanically excited for haptic feedback. The mechanical excitation is performed by an actuator, for example in the form of a tension anchor electromagnet, which is then also part of the oscillatory system.

The elastically suspended oscillatory system tends to be set into oscillation upon external excitation, such as vibrations acting on the vehicle, particularly during driving. This may result is disturbing noises, which may be disadvantageous.

An object of the invention is to improve an operating unit with haptic feedback to such an extent that oscillations due to unintended external excitations of the elastically suspended oscillatory system are largely suppressed.

According to the invention, the object of the invention is achieved by an operating unit for a device, in particular for a vehicle for operating a vehicle component and in particular MMI or HMI, wherein the operating unit is provided with
  a housing,
  an operating unit comprising a touch-sensitive operating surface and a touch sensor system,
  wherein the operating element is elastically mounted to the housing for the purpose of being automatically returned back to its rest position after being deflected out of said rest position,
  an actuator for mechanical excitation of the operating element out of its rest position for the purpose of tactile feedback in response to an operation of the operating element,
  a sensor for detecting a movement of the operating element and/or an acceleration and/or force acting on the operating element, and
  an evaluation and control unit receiving signals from the sensor of the touch sensor system of the operating element and controlling the actuator for mechanical excitation of the operating element for the purpose of tactile feedback in response to an operation of the operating element,
  wherein, when a movement of the operating element and/or an acceleration and/or force acting on the operating element are/is detected without sensing a touch on the operating surface in these cases, the evaluation and control unit controls the actuator to maintain the rest position of the operating element and/or to move the operating element back to its rest position and/or to stabilize the operating element.

The operating unit according to the invention is provided with a housing in and/or at which an operating element is arranged which comprises a touch-sensitive operating surface with a touch sensor system. The operating element is elastically mounted in and/or at the housing for the purpose of being automatically returned back to its rest position after being deflected out of said rest position. For the purpose of haptic feedback, the operating element is moved out of its rest position using mechanical excitation by means of an actuator when the operating element has been operated or when a valid movement of the operating element is detected upon simultaneous detection of the touch on the operating surface.

According to the invention, the operating unit comprises a sensor which detects a movement of the operating element and/or an acceleration and/or force acting on the operating element without that the operating surface has been touched (detection of an external excitation of the operating element). This sensor provides its measurement signals to an evaluation and control unit which further receives signals from the touch sensor system of the operating element. Upon detection of a valid operation of the operating element, the evaluation and control unit controls the actuator to mechanically excite the operating element for the purpose of tactile haptic feedback. This control can be performed depending on the signal provided by the touch sensor system (valid operation or mechanical excitation of the operating element only upon detection of a touch on the operating surface).

According to the invention, said evaluation and control unit or a separately implemented unit is applied to use a movement of the operating element and/or an acceleration acting on the operating element and/or a force acting on the operating element without simultaneously sensing a touch on the operating surface in order to control the actuator to maintain the rest position of the operating element and/or to move the operating element back to its rest position. If, for example, the oscillatory system of the operating unit is unintendedly externally excited due to vibrations acting on the operating unit, the actuator immediately works, according to the invention, against this externally excited movements of the oscillatory system, i.e. the actuator maintains the operating element in its rest position or transfers it into its rest position when already the smallest deflections occur. There-fore, the oscillatory system cannot "build up" which thus prevents the development of unintended vibration noises.

The sensor provided according to the invention for detecting a movement of the operating element due to external excitation can be a component that is provided in addition to a force sensor. The force sensor serves to detect an application of force to the operating element when the operating surface is touched. If said force sensor and the touch sensor system respond, this is an indication that the operating element has been operated.

The two above-described sensors can work according to same active principles, i.e. resistively, capacitively, inductively or optically, or they work according to different active principles.

In an advantageous further embodiment of the invention, it may be provided that the operating element is a touchscreen or a touchpad.

Further, it may advantageously be provided that the sensor is arranged outside of the operating element and outside of the movable elements coupled to the operating element, or that the sensor is arranged at the operating element or is coupled to the operating element so as to move together with the operating element.

In an expedient further embodiment of the invention, it may be provided that the actuator is configured as an electromagnet with a stator and an anchor movable relative to the stator for mechanical excitation of the operating element, and that the sensor is configured as a coil sensing a movement of the anchor in the form of an induced coil voltage. The coil applied as a sensor can for example be the exciter coil of the electromagnet or a separate measuring coil, for example at the anchor or the stator of the electromagnet.

In a further advantageous embodiment of the invention, it may be provided that the actuator comprises at least one piezoceramic element for the mechanical excitation of the operating element, and that the piezoceramic element works as a sensor, in case of a movement free from a control of the actuator, and senses said movement as a voltage occurring as a result of the piezoelectric effect at the piezoceramic element.

In the following, the invention is described in more detail by means of an exemplary embodiment and by reference to the drawing. The drawing schematically shows an operating unit comprising an operating element with tactile haptic feedback and force sense.

Touch operating elements, such as displays or touchpads, are nowadays frequently provided with haptic feedback to provide the user with an additional feedback on the actuation of a function or location of an active touch surface. Particularly in the automotive industry, where driver distraction shall be kept as low as possible, such systems are partially applied in combination with an actuating force detection. The haptic feedback is usually realized by a vibration of the touch surface. For this purpose, the touch surface has to be mounted movable with respect to the rest of the device. Active elements, such as electromagnets or piezo components with a corresponding electric control deflect the touch surface in the desired direction. Return springs return the surface back to its initial position. This movement is frequently damped by passive damping elements. The overall system is thus able to oscillate. Depending on the geometry and ground, such systems have resonance frequencies. If the system is externally excited near these frequencies, e.g. by vehicle movement or vibrations, the movements may build up and an unintended oscillation of the touch surface may occur. This is often accompanied by an unintended noise generation.

The subject matter of this invention is a mechanism which minimizes or stops the above-described effect. A reaction to an external excitation of the overall system is only possible if the external excitation is detected. This can be realized by either an additional sensor in the form of an acceleration or movement sensor, or by the drive element serving for an intended movement of the surface in case of a feedback. In the latter case, the coil voltage would have to be measured, for example according to the immersion coil principle, if an electromagnet is used. The relative movement of magnet and coil would make it possible to detect an external excitation by the induced coil voltage. If the deflection of the touch surface is now known according to magnitude and phase, the external excitation can be damped or compensated by an appropriate (e.g. inversely phased) control of the actuator serving for intended deflection of the surface. The additional acceleration or movement sensor can be integrated into the fixed part of the overall system or into the movable part. In the latter case, a control is required which calculates the phase position of the movable part by means of the knowledge of the dynamics of the system and correspondingly controls the actuator.

BRIEF DESCRIPTION OF THE DRAWING

FIG. 1 is a schematic view of an exemplary embodiment.

DETAILED DESCRIPTION

With reference to the exemplary embodiment according to the drawing, operating unit 10 comprises a housing 12 on, at or in which an operating element 14 with an operating surface 16 and a touch sensor system indicated at 18 is arranged. In this exemplary embodiment, operating element 14 is designed as a touchscreen, for example.

As schematically indicated in the drawing, operating element 14 can be elastically mounted in a lateral or vertical manner. If an operating force is applied to operating surface 16 of operating element 14, operating element 14 slightly deflects, which is detected by an operating sensor 20. The touch is sensed by touch sensor system 18. If both signals are present at the input of the evaluation and control unit 22 (and operating sensor 20 optionally senses a significantly large mechanical impact on operating element 14), the evaluation and control unit 22 controls an actuator 24 which is for its parts mechanically coupled to operating element 14 and sets the operating element into oscillation or exerts at least an impulse of movement. This serves for tactile haptic feedback to the user that he/she has operated the operating element 14 in the manner prescribed for executing the desired function.

However, now the elastically suspended operating element 14 also unintentionally mechanically oscillates when being externally excited by forces acting on operating unit 10 from outside. Here, the cause for such an external excitation is a vibration acting on a vehicle during driving, for example.

According to the invention, a further sensor 26 now serves to prevent operating element 14 from moving due to such an external excitation, wherein said sensor is sensitive in the directions in which operating element 14 can be set into oscillation when being externally excited. In the evaluation and control unit 22, the signal of sensor 26 is now evaluated to control the actuator 24 with phase accuracy in order that the actuator excites operating element 14 in an inverse phase relation to the external excitation, such that operating element 14 ideally maintains its rest position. If sensor 26 also senses a valid operation of operating element 14, or if sensor 26 is inversely united with operating sensor 20, the evaluation of touch sensor system 18 is required in addition to the detection of an external excitation. In case of an external excitation, touch sensor system 18 should not sense a touch on operating surface 16 of operating element 14.

LIST OF REFERENCE NUMERALS

10 operating unit
12 housing
14 operating element
16 operating surface
18 touch sensor system
20 operating sensor 22 control unit
24 actuator
26 sensor

The invention claimed is:

1. An operating unit for a device for operating a vehicle component comprising
a housing,
an operating element comprising a touch-sensitive operating surface and a touch sensor system,
wherein the operating element is elastically mounted to the housing for the purpose of being automatically returned back to its rest position after being deflected out of said rest position,
an actuator for mechanical excitation of the operating element out of its rest position for the purpose of tactile feedback in response to an operation of the operating element and for maintaining the operating element at its rest position when the operating element is not activated,
a sensor for detecting a movement of the operating element, an acceleration, force acting on the operating element, or a combination thereof and
an evaluation and control unit receiving signals from the sensor and the touch sensor system of the operating element and controlling the actuator for mechanical excitation of the operating element for the purpose of tactile feedback in response to an operation of the operating element and for maintaining the operating element at its rest position when the operating element is not activated, wherein
when a movement of the operating element, an acceleration, force acting on the operating element, or a combination thereof is detected by the sensor without sensing a touch on the operating surface, and the evaluation and control unit controls the actuator to maintain the rest position of the operating element, to move the operating element back to its rest position, to stabilize the operating element, or combinations thereof.

2. The operating unit according to claim 1, wherein the operating element is a touchscreen or a touchpad.

3. The operating unit according to claim 1, wherein the sensor is arranged outside of the operating element and outside of the movable elements coupled to the operating element.

4. The operating unit according to claim 1, wherein the sensor is arranged at the operating element or is coupled to the operating element so as to move together with the operating element.

5. The operating unit according to claim 1, wherein the actuator is configured as an electromagnet with a stator and an anchor movable relative to the stator for mechanical excitation of the operating element, and wherein an operating sensor is configured as a coil sensing a movement of the anchor in the form of an induced coil voltage.

6. The operating unit according to claim 1, wherein the actuator comprises at least one piezoceramic element for the mechanical excitation of the operating element, and wherein the piezoceramic element works as an operating sensor, in case of a movement of the operating element free from a control of the actuator, and senses said movement as a voltage at the piezoceramic element occurring as a result of the piezoelectric effect.

* * * * *